(12) United States Patent
Wang et al.

(10) Patent No.: US 11,787,896 B2
(45) Date of Patent: Oct. 17, 2023

(54) PREPARATION METHOD OF ULTRAVIOLET (UV)-RESISTANT AND TRANSPARENT LIGNIN-BASED POLYURETHANE (PU) ELASTOMER

(71) Applicant: JIANGNAN UNIVERSITY, Wuxi (CN)

(72) Inventors: Chaoxia Wang, Wuxi (CN); Xinxiang Li, Wuxi (CN); Yunjie Yin, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/874,866

(22) Filed: Jul. 27, 2022

(65) Prior Publication Data

US 2023/0047011 A1 Feb. 16, 2023

(30) Foreign Application Priority Data

Aug. 12, 2021 (CN) .......................... 202110922532.0

(51) Int. Cl.
| | |
|---|---|
| *C08G 18/10* | (2006.01) |
| *C08G 18/64* | (2006.01) |
| *C08G 18/48* | (2006.01) |
| *C08G 18/66* | (2006.01) |
| *C08G 18/75* | (2006.01) |

(52) U.S. Cl.
CPC ......... *C08G 18/6492* (2013.01); *C08G 18/10* (2013.01); *C08G 18/4854* (2013.01); *C08G 18/6692* (2013.01); *C08G 18/755* (2013.01)

(58) Field of Classification Search
CPC ............... C08G 18/6492; C08G 18/10; C08G 18/4854; C08G 18/6692; C08G 18/755
See application file for complete search history.

(56) References Cited

U.S. PATENT DOCUMENTS

| 2019/0112500 A1* | 4/2019 | Berger ................ C09D 175/14 |
| 2021/0163746 A1* | 6/2021 | Dürsen ............... C08G 18/7664 |

FOREIGN PATENT DOCUMENTS

WO WO-2017067769 A1 * 4/2017 ............. C08G 18/10

OTHER PUBLICATIONS

"High Modulus, Strength, and Toughness Polyurethane Elastomer based on Unmodified Lignin" to Li et al. ACS Sustainable Chem. Eng. 2017, 5, 7942-7979.*

* cited by examiner

Primary Examiner — Michael L Leonard
(74) Attorney, Agent, or Firm — Volpe Koenig (57) ABSTRACT

The present disclosure discloses a preparation method of an ultraviolet (UV)-resistant and transparent lignin-based polyurethane (PU) elastomer. During the synthesis process, natural lignin-based polyols are directly used as an end-capping agent, isophorone diisocyanate and 2,2-dimethylolbutyric acid are used as a hard segment and polyether chain polyols are used as a soft segment, to synthesize a PU elastomer with a transparent brown appearance, excellent high elasticity and elastic recovery performance, as well as excellent mechanical properties, excellent UV resistance and repeatable processability. The lignin-based PU elastomer has a simple preparation process, and has great potential values for use in the fields such as PU elastomer film, fabric coating, and elastic fiber and biomass polymer materials.

9 Claims, 6 Drawing Sheets

PREPARATION METHOD OF ULTRAVIOLET (UV)-RESISTANT AND TRANSPARENT LIGNIN-BASED POLYURETHANE (PU) ELASTOMER

CROSS REFERENCE TO RELATED APPLICATION

This patent application claims the benefit of and priority to Chinese Patent Application No. 202110922532.0, filed on Aug. 12, 2021, entitled "PREPARATION METHOD OF ULTRAVIOLET (UV)-RESISTANT AND TRANSPARENT LIGNIN-BASED POLYURETHANE (PU) ELASTOMER", which is herein specifically and entirely incorporated by reference as part of the present application.

FIELD OF INVENTION

The present disclosure belongs to the technical field of biomass polymer materials, in particular to a preparation method of an ultraviolet (UV)-resistant and transparent lignin-based polyurethane (PU) elastomer.

BACKGROUND

Polyurethane (PU), as a block copolymer composed of polyisocyanates and polyols, is widely used in foams, elastomers, coatings and adhesives. The amazing properties of PU come from its wide variety of commercially available raw materials, highly flexible formulations and widely tunable molecular structures. However, most commercial polyols come from non-renewable petroleum sources. It has become a hot spot in the pursuit of green PU materials by looking for alternative biomass resources to synthesize the PU. Lignin, the second largest biomass resource from plants, has received increasing attention due to wide range of sources and low cost. Although having an abundant resource, the lignin has a low utilization rate currently. The lignin is mainly treated as waste residues in pulping and bio-refining industries, resulting in huge waste of resources and environmental pollution. In the past decade, several studies have focused on the utilization of lignin to synthesize PU materials based on abundant hydroxyl groups in the lignin molecule.

The lignin, due to its rich phenolic and aliphatic hydroxyl groups to easily react with isocyanates to form urethane bonds, is a desirable candidate for preparation of bio-based and high value-added products. The rigidity of lignin can impart high modulus and strength to lignin-based PU elastomers. Taking advantages of high thermal stability, renewability and biodegradability, the lignin has been extensively studied to produce bio-based PU materials. However, additional polyol or lignin modifications may complicate the synthesis procedure, thus increasing production costs and environmental impacts. Therefore, it is of great significance to introduce unmodified natural lignin as a polyol to endow the PU elastomers with an excellent cross-linked network structure and elastic recovery ability.

Patent CN101845146A disclosed a method for modifying lignin by enzymatic hydrolysis and then for synthesizing PU elastomers. After enzymatic hydrolysis, the synthesized PU elastomers have a smaller molecular weight, larger activity and increased hydroxyl group content, thus leading to an increase in the degree of cross-linking, such that the synthesized PU elastomers do not have the reprocessability.

Patent CN109485824A disclosed a method of alkali digestion and depolymerization for modifying lignin, to synthesize lignin capable of being repeatedly processed. However, there is neither data to support UV resistance nor desirable transparency in the synthesized lignin.

At present, many studies on lignin-based PU focus on the way to improve the reactivity of lignin, but do not take into account the environmental pollution caused by modifications, thereby making the material that should be green and sustainable lose its meaning. Moreover, there is a lack of research on additional properties of anti-UV and self-coloring brought by the lignin.

SUMMARY

An object of the present disclosure is to provide a reprocessable, UV-resistant, transparent and colored lignin-based PU elastomer and a preparation method thereof.

The present disclosure provides a preparation method of a UV-resistant and transparent lignin-based PU elastomer, including the following steps:

(1) dissolving polyether chain polyol and isophorone diisocyanate in N,N-dimethylformamide (DMF), adding a uniformly-dissolved mixture into a container with a polytetrafluoroethylene stirring bar, followed by heating and conducting a reaction at a constant temperature to obtain a prepolymer;

(2) dissolving 2,2-dimethylolbutyric acid and a catalyst together in the DMF and adding dropwise to the prepolymer for a chain extension reaction; and then dissolving lignin in the DMF and adding dropwise to the prepolymer for an end-capping reaction, followed by adding a neutralizing reagent for a full neutralization after the reactions to obtain a product; and (3) subjecting the product obtained in step (2) to rotary evaporation, drying, thermoplastic molding and hot pressing to obtain the lignin-based PU elastomer.

Further, in steps (1) and (2), the polyether chain polyol, the 2,2-dimethylolbutyric acid and the lignin may be vacuum-dried to remove moisture before addition.

Further, in step (1), the polyether chain polyol may include one or more selected from the group consisting of polytetrahydrofuran 1000, polytetrahydrofuran 2000, polyethylene glycol 1000, polyethylene glycol 2000, polyethylene glycol 4000, polycaprolactone diol 1000 and polycaprolactone diol 2000.

Further, in step (1), the reaction may be conducted at 80° C. to 85° C. for 2 h to 2.5 h.

Further, in step (2), the chain extension reaction and the end-capping reaction each may be conducted for 2 h to 2.5 h, and the neutralization may be conducted for 0.5 h to 1 h.

Further, a content of an isocyanate group of the isophorone diisocyanate in step (1) and a content of a hydroxyl group in the polyether chain polyol and the 2,2-dimethylolbutyric acid in steps (1) and (2) may have a molar ratio of 5:2.

Further, in step (1), a total of 5 parts by molar weight of the isophorone diisocyanate may be added, and 2 parts by molar weight of the isophorone diisocyanate may react with the polyether chain polyol and the 2,2-dimethylolbutyric acid; in step (2), the remaining 3 parts by molar weight of the isophorone diisocyanate and the lignin may have a mass ratio of 99:1, 98:2, 97:3, 96:4, 95:5 and 90:10, and corresponding mass fractions may be 0.21%, 0.42%, 0.63%, 0.84%, 1.06% and 2.22%.

Further, in step (2), the 2,2-dimethylolbutyric acid and the catalyst may have a blending ratio of 100:1 to 50:1, and a dropping rate of 15 ml/h to 20 ml/h.

Further, in step (2), the catalyst may include dibutyltin dilaurate, dimethylcyclohexylamine and pentamethyldiethylene triamine.

Further, in step (2), the neutralizing reagent may include triethylamine and ammonia water.

Further, in step (3), the hot pressing may be conducted at 80° C. to 120° C. and 10 MPa to 15 MPa for 10 min to 15 min.

Compared with the prior art, the present disclosure has the following significant advantages: during the synthesis process of the lignin-based PU elastomer, natural lignin-based polyols are directly used as an end-capping agent, isophorone diisocyanate and 2,2-dimethylolbutyric acid are used as a hard segment and polyether chain polyols are used as a soft segment, to synthesize a PU elastomer with a bright and transparent brown appearance, excellent high elasticity and elastic recovery performance, as well as excellent mechanical properties, excellent UV resistance and repeatable processability, which are not found in other lignin-based PUs. The lignin-based PU elastomer has a simple preparation process, and has great potential values for use in the fields such as PU elastomer film, fabric coating, and elastic fiber and biomass polymer materials.

DETAILED DESCRIPTION OF THE EMBODIMENTS

The following further describes the present disclosure in detail with reference to the accompanying drawings and examples.

Example 1

(1) 10 g of polytetrahydrofuran 2000 and 5.56 g of isophorone diisocyanate were added to a three-necked flask preheated at 80° C., followed by reaction for 1.5 h under mechanical stirring at 350 r/min to obtain a prepolymer.

(2) 0.74 g of 2,2-dimethylolbutyric acid was dried in a vacuum drying oven at 80° C. for 8 h, and then dissolved in N,N-dimethylformamide (DMF) together with 0.5% dibutyltin dilaurate (as a catalyst); the resulting mixture was added to the prepolymer with a constant pressure funnel at a dropping rate of 15 ml/h, followed by reaction at 80° C. for 2 h under mechanical stirring at 400 r/min to obtain a system.

(3) 33.6 mg of lignin dried in the vacuum drying oven at 80° C. for 8 h was dissolved in the DMF, and the resulting mixture was added dropwise to the system obtained in step (2) with a constant pressure funnel, followed by reaction at 80° C. for 2 h under mechanical stirring at 400 r/min.

(4) The system was cooled to 40° C., 0.66 g of triethylamine was added, followed by a neutralization for 0.5 h under mechanical stirring at 400 r/min to obtain a product.

(5) The DMF in the product was removed by rotary evaporation; the product was subjected to drying, then thermoplastic molding in a vacuum drying oven at 110° C. for 12 h, and hot pressing at 80° C. and 15 MPa for 10 min, to obtain a reprocessable, UV-resistant, transparent and colored lignin-based PU elastomer film.

In Example 1, the prepared lignin-based PU elastomer has a desirable transmittance, an elongation at break reaching 595.1% and an elastic recovery reaching 92.4%. Moreover, the elastomer has desirable reprocessability at 130° C. Meanwhile, a hot-pressed fabric of the lignin-based PU elastomer have L*, a*, b*, C* and h° values of 80.71, 4.71, 30.05, 30.42 and 81.1, respectively. In addition, the elastomer has a UPF value reaching 596.47, with excellent anti-UV performance.

Example 2

(1) 10 g of polytetrahydrofuran 2000 and 5.56 g of isophorone diisocyanate were added to a three-necked flask preheated at 80° C., followed by reaction for 1.5 h under mechanical stirring at 350 r/min to obtain a prepolymer.

(2) 0.74 g of 2,2-dimethylolbutyric acid was dried in a vacuum drying oven at 80° C. for 8 h, and then dissolved in N,N-dimethylformamide (DMF) together with 0.2% dibutyltin dilaurate (as a catalyst); the resulting mixture was added to the prepolymer with a constant pressure funnel at a dropping rate of 18 ml/h, followed by reaction at 80° C. for 2 h under mechanical stirring at 400 r/min to obtain a system.

(3) 68.0 mg of lignin dried in the vacuum drying oven at 80° C. for 8 h was dissolved in the DMF, and the resulting mixture was added dropwise to the system obtained in step (2) with a constant pressure funnel, followed by reaction at 80° C. for 2 h under mechanical stirring at 400 r/min.

(4) The system was cooled to 40° C., 0.66 g of triethylamine was added, followed by a neutralization for 0.5 h under mechanical stirring at 400 r/min to obtain a product.

(5) The DMF in the product was removed by rotary evaporation; the product was subjected to drying, then thermoplastic molding in a vacuum drying oven at 110° C. for 12 h, and hot pressing at 90° C. and 15 MPa for 10 min, to obtain a reprocessable, UV-resistant, transparent and colored lignin-based PU elastomer film.

In Example 2, the prepared lignin-based PU elastomer has a desirable transmittance, an elongation at break reaching 685.8% and an elastic recovery reaching 93.2%. Moreover, the elastomer has desirable reprocessability at 130° C. Meanwhile, a hot-pressed fabric of the lignin-based PU elastomer have L*, a*, b*, C* and h° values of 65.91, 11.78, 39.41, 41.13 and 73.36, respectively. In addition, the elastomer has a UPF value reaching 2353.35, with excellent anti-UV performance.

Example 3

(1) 10 g of polytetrahydrofuran 2000 and 5.56 g of isophorone diisocyanate were added to a three-necked flask preheated at 80° C., followed by reaction for 1.5 h under mechanical stirring at 350 r/min to obtain a prepolymer.

(2) 0.74 g of 2,2-dimethylolbutyric acid was dried in a vacuum drying oven at 80° C. for 8 h, and then dissolved in N,N-dimethylformamide (DMF) together with 0.1% dibutyltin dilaurate (as a catalyst); the resulting mixture was added to the prepolymer with a constant pressure funnel at a dropping rate of 20 ml/h, followed by reaction at 80° C. for 2 h under mechanical stirring at 400 r/min to obtain a system.

(3) 103.1 mg of lignin dried in the vacuum drying oven at 80° C. for 8 h was dissolved in the DMF, and the resulting mixture was added dropwise to the system obtained in step (2) with a constant pressure funnel, followed by reaction at 80° C. for 2 h under mechanical stirring at 400 r/min.

(4) The system was cooled to 40° C., 0.66 g of triethylamine was added, followed by a neutralization for 0.5 h under mechanical stirring at 400 r/min to obtain a product.

(5) The DMF in the product was removed by rotary evaporation; the product was subjected to drying, then thermoplastic molding in a vacuum drying oven at 110° C. for 12 h, and hot pressing at 80° C. and 15 MPa for 10 min, to obtain a reprocessable, UV-resistant, transparent and colored lignin-based PU elastomer film.

In Example 3, the prepared lignin-based PU elastomer has a desirable transmittance, an elongation at break reaching 901.8% and an elastic recovery reaching 93.5%. Moreover, the elastomer has desirable reprocessability at 130° C. Meanwhile, a hot-pressed fabric of the lignin-based PU elastomer have $L^*$, $a^*$, $b^*$, $C^*$ and $h°$ values of 56.48, 16.15, 41.11, 44.16 and 68.56, respectively. In addition, the elastomer has a UPF value reaching 5583.59, with excellent anti-UV performance.

Example 4

(1) 10 g of polytetrahydrofuran 2000 and 5.56 g of isophorone diisocyanate were added to a three-necked flask preheated at 80° C., followed by reaction for 1.5 h under mechanical stirring at 350 r/min to obtain a prepolymer.

(2) 0.74 g of 2,2-dimethylolbutyric acid was dried in a vacuum drying oven at 80° C. for 8 h, and then dissolved in N,N-dimethylformamide (DMF) together with 0.4% dibutyltin dilaurate (as a catalyst); the resulting mixture was added to the prepolymer with a constant pressure funnel at a dropping rate of 16 ml/h, followed by reaction at 80° C. for 2 h under mechanical stirring at 400 r/min to obtain a system.

(3) 138.9 mg of lignin dried in the vacuum drying oven at 80° C. for 8 h was dissolved in the DMF, and the resulting mixture was added dropwise to the system obtained in step (2) with a constant pressure funnel, followed by reaction at 80° C. for 2 h under mechanical stirring at 400 r/min.

(4) The system was cooled to 40° C., 0.66 g of triethylamine was added, followed by a neutralization for 0.5 h under mechanical stirring at 400 r/min to obtain a product.

(5) The DMF in the product was removed by rotary evaporation; the product was subjected to drying, then thermoplastic molding in a vacuum drying oven at 110° C. for 12 h, and hot pressing at 100° C. and 10 MPa for 10 min, to obtain a reprocessable, UV-resistant, transparent and colored lignin-based PU elastomer film.

In Example 4, the prepared lignin-based PU elastomer has a desirable transmittance, an elongation at break reaching 1008.9% and an elastic recovery reaching 94.3%. Moreover, the elastomer has desirable reprocessability at 130° C. Meanwhile, a hot-pressed fabric of the lignin-based PU elastomer have $L^*$, $a^*$, $b^*$, $C^*$ and $h°$ values of 55.22, 16.48, 41.2, 44.38 and 68.2, respectively. In addition, the elastomer has a UPF value reaching 7049.17, with excellent anti-UV performance.

Example 5

(1) 10 g of polytetrahydrofuran 2000 and 5.56 g of isophorone diisocyanate were added to a three-necked flask preheated at 80° C., followed by reaction for 1.5 h under mechanical stirring at 350 r/min to obtain a prepolymer.

(2) 0.74 g of 2,2-dimethylolbutyric acid was dried in a vacuum drying oven at 80° C. for 8 h, and then dissolved in N,N-dimethylformamide (DMF) together with 0.3% dibutyltin dilaurate (as a catalyst); the resulting mixture was added to the prepolymer with a constant pressure funnel at a dropping rate of 19 ml/h, followed by reaction at 80° C. for 2 h under mechanical stirring at 400 r/min to obtain a system.

(3) 175.4 mg of lignin dried in the vacuum drying oven at 80° C. for 8 h was dissolved in the DMF, and the resulting mixture was added dropwise to the system obtained in step (2) with a constant pressure funnel, followed by reaction at 80° C. for 2 h under mechanical stirring at 400 r/min.

(4) The system was cooled to 40° C., 0.66 g of triethylamine was added, followed by a neutralization for 0.5 h under mechanical stirring at 400 r/min to obtain a product.

(5) The DMF in the product was removed by rotary evaporation; the product was subjected to drying, then thermoplastic molding in a vacuum drying oven at 110° C. for 12 h, and hot pressing at 120° C. and 10 MPa for 10 min, to obtain a reprocessable, UV-resistant, transparent and colored lignin-based PU elastomer film.

In Example 5, the prepared lignin-based PU elastomer has a desirable transmittance, an elongation at break reaching 1027.3% and an elastic recovery reaching 94.5%. Moreover, the elastomer has desirable reprocessability at 130° C. Meanwhile, a hot-pressed fabric of the lignin-based PU elastomer have $L^*$, $a^*$, $b^*$, $C^*$ and $h°$ values of 49.64, 18.5, 37.86, 42.14 and 63.95, respectively. In addition, the elastomer has a UPF value reaching 8658.85, with excellent anti-UV performance.

Example 6

(1) 10 g of polytetrahydrofuran 2000 and 5.56 g of isophorone diisocyanate were added to a three-necked flask preheated at 80° C., followed by reaction for 1.5 h under mechanical stirring at 350 r/min to obtain a prepolymer.

(2) 0.74 g of 2,2-dimethylolbutyric acid was dried in a vacuum drying oven at 80° C. for 8 h, and then dissolved in N,N-dimethylformamide (DMF) together with 0.4% dibutyltin dilaurate (as a catalyst); the resulting mixture was added to the prepolymer with a constant pressure funnel at a dropping rate of 17 ml/h, followed by reaction at 80° C. for 2 h under mechanical stirring at 400 r/min to obtain a system.

(3) 370.4 mg of lignin dried in the vacuum drying oven at 80° C. for 8 h was dissolved in the DMF, and the resulting mixture was added dropwise to the system obtained in step (2) with a constant pressure funnel, followed by reaction at 80° C. for 2 h under mechanical stirring at 400 r/min.

(4) The system was cooled to 40° C., 0.66 g of triethylamine was added, followed by a neutralization for 0.5 h under mechanical stirring at 400 r/min to obtain a product.

(5) The DMF in the product was removed by rotary evaporation; the product was subjected to drying, then thermoplastic molding in a vacuum drying oven at 110° C.

for 12 h, and hot pressing at 120° C. and 10 MPa for 10 min, to obtain a reprocessable, UV-resistant, transparent and colored lignin-based PU elastomer film.

In Example 6, the prepared lignin-based PU elastomer has a desirable transmittance, an elongation at break reaching 1049.5% and an elastic recovery reaching 94.7%. Moreover, the elastomer has desirable reprocessability at 130° C. Meanwhile, a hot-pressed fabric of the lignin-based PU elastomer have $L^*$, $a^*$, $b^*$, $C^*$ and $h°$ values of 32.29, 18.49, 15.18, 23.92 and 39.4, respectively. In addition, the elastomer has a UPF value reaching 9451.81, with excellent anti-UV performance.

Comparative Example

A preparation method was the same as those of Examples 1-6, except that lignin was replaced by 1,4-butanediol.

TABLE 1

Mechanical properties of PU

| Sample | Tensile strength (MPa) | Elongation at break (%) | Young's modulus (MPa) | Elastic recovery (%) |
|---|---|---|---|---|
| Comparative Example 1 | 25.3 | 1470.7 | 29.3 | 87.0 |
| Example 1 | 4.6 | 595.1 | 17.2 | 92.4 |
| Example 2 | 5.9 | 685.8 | 17.0 | 93.2 |
| Example 3 | 11.4 | 901.8 | 28.1 | 93.5 |
| Example 4 | 12.1 | 1008.9 | 20.4 | 94.3 |
| Example 5 | 11.4 | 1027.3 | 20.8 | 94.5 |
| Example 6 | 16.2 | 1049.5 | 19.5 | 94.7 |

Figure 1A:
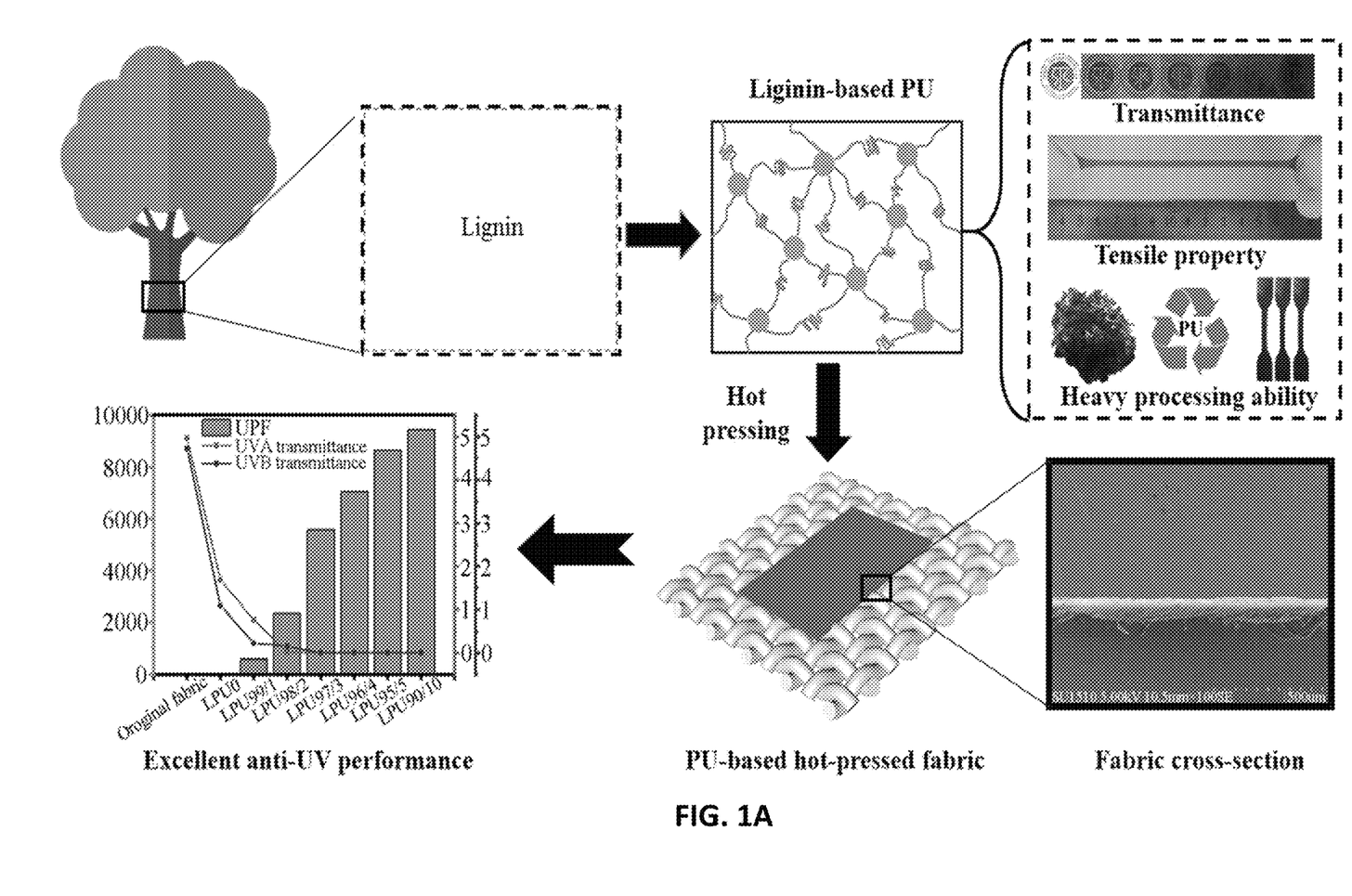
FIG. 1A shows a schematic diagram of a lignin-based PU elastomer of the present disclosure.
Figure 1B:
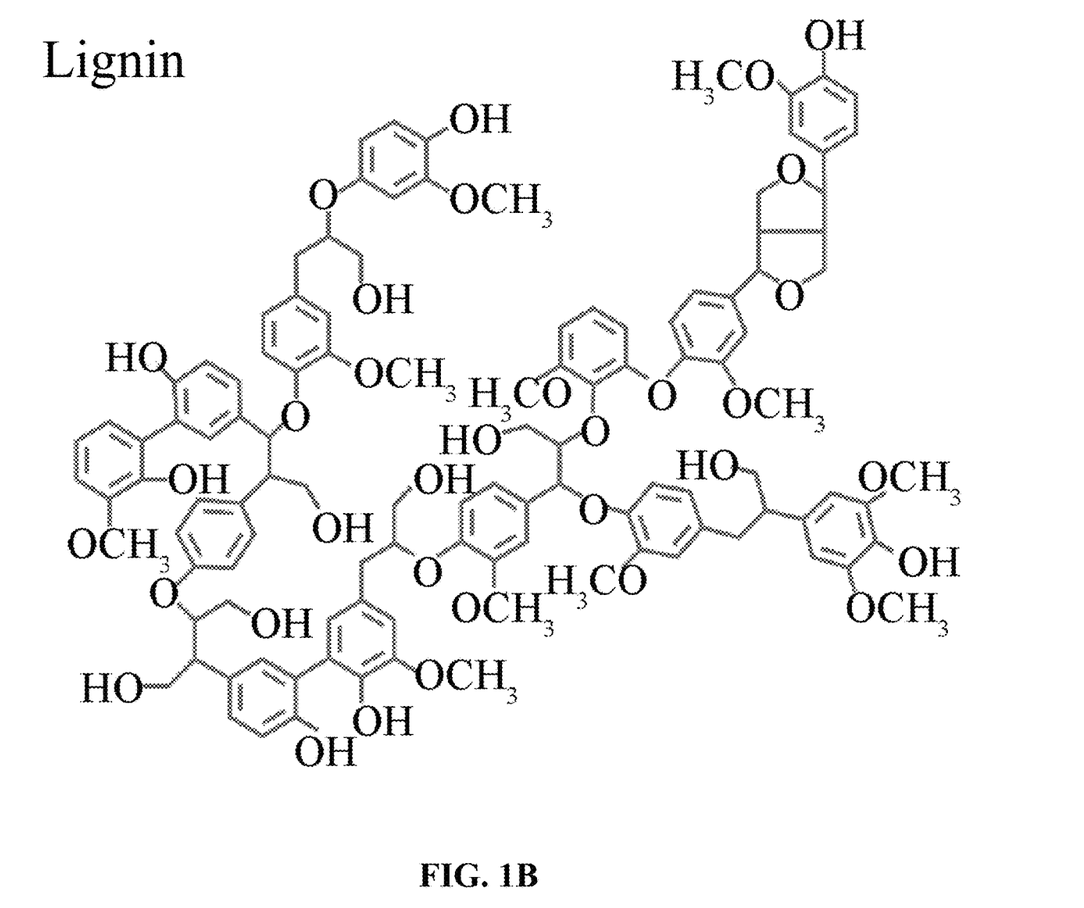
FIG. 1B shows the molecular formula of lignin.
Figure 2:
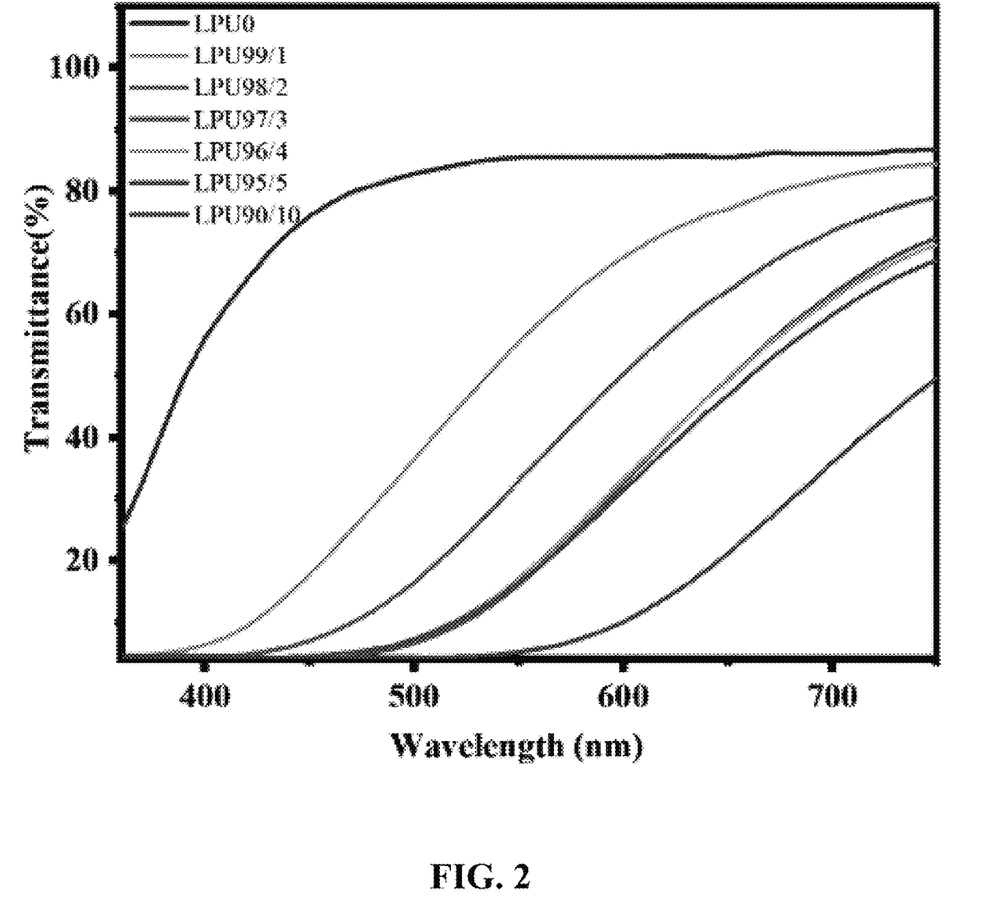
FIG. 2 shows a schematic diagram of transmittance curves of films of lignin-based PU elastomers prepared in all examples of the present disclosure.
Figure 3:
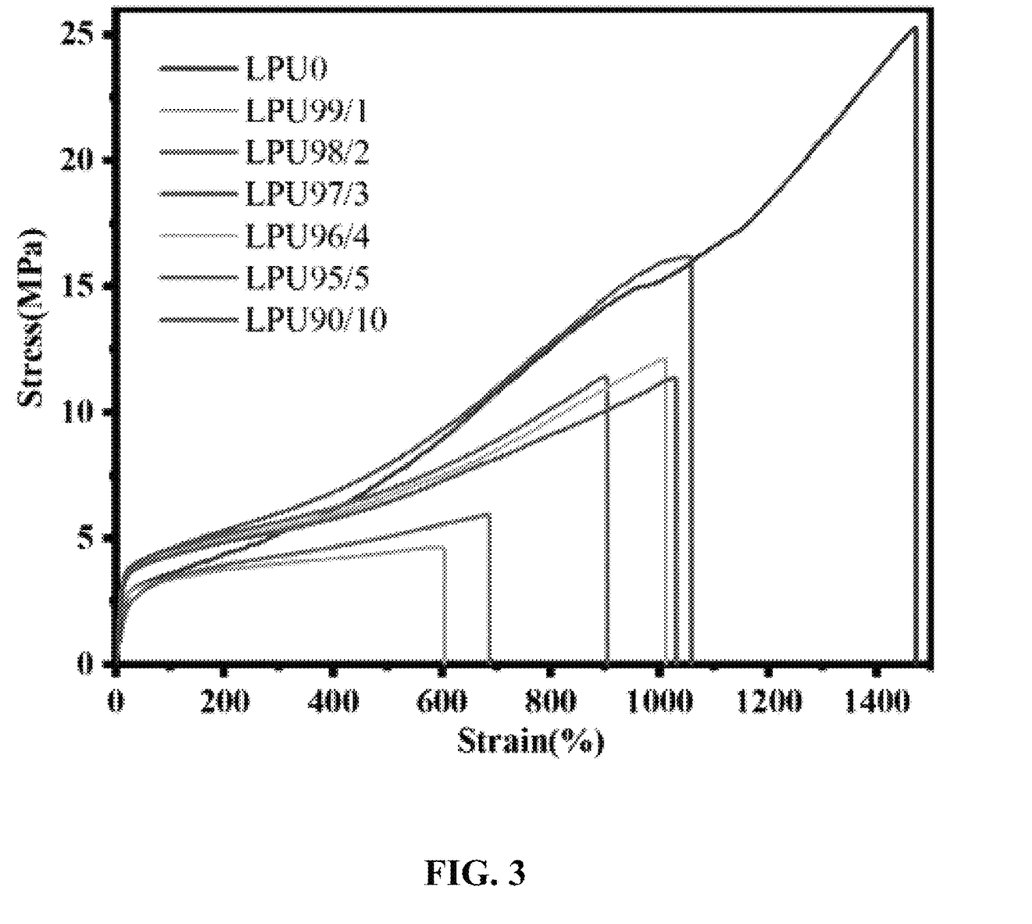
FIG. 3 shows a schematic diagram of stress-strain curves of the films of lignin-based PU elastomers prepared in all examples of the present disclosure.
Figure 4:
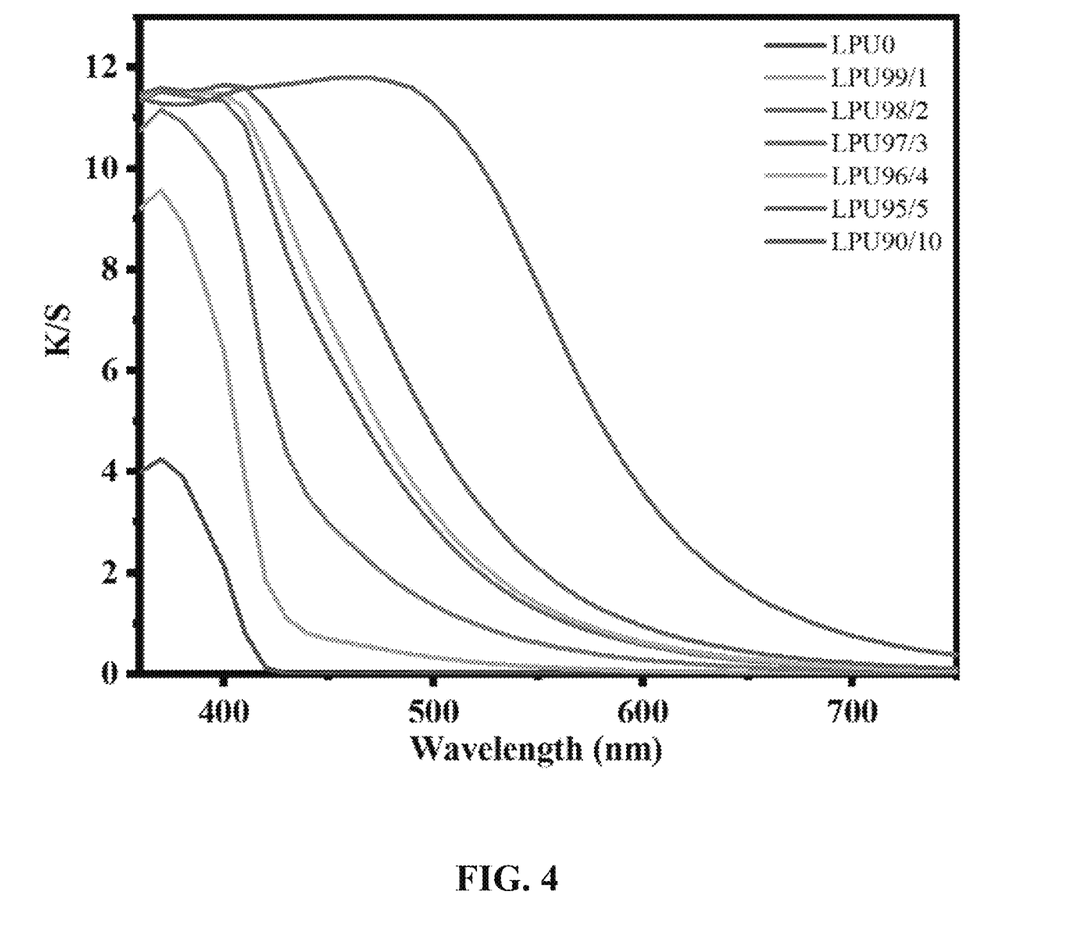
FIG. 4 shows a schematic diagram of K/S curves of hot-pressed fabrics of the lignin-based PU elastomers prepared in all examples of the present disclosure.
Figure 5:
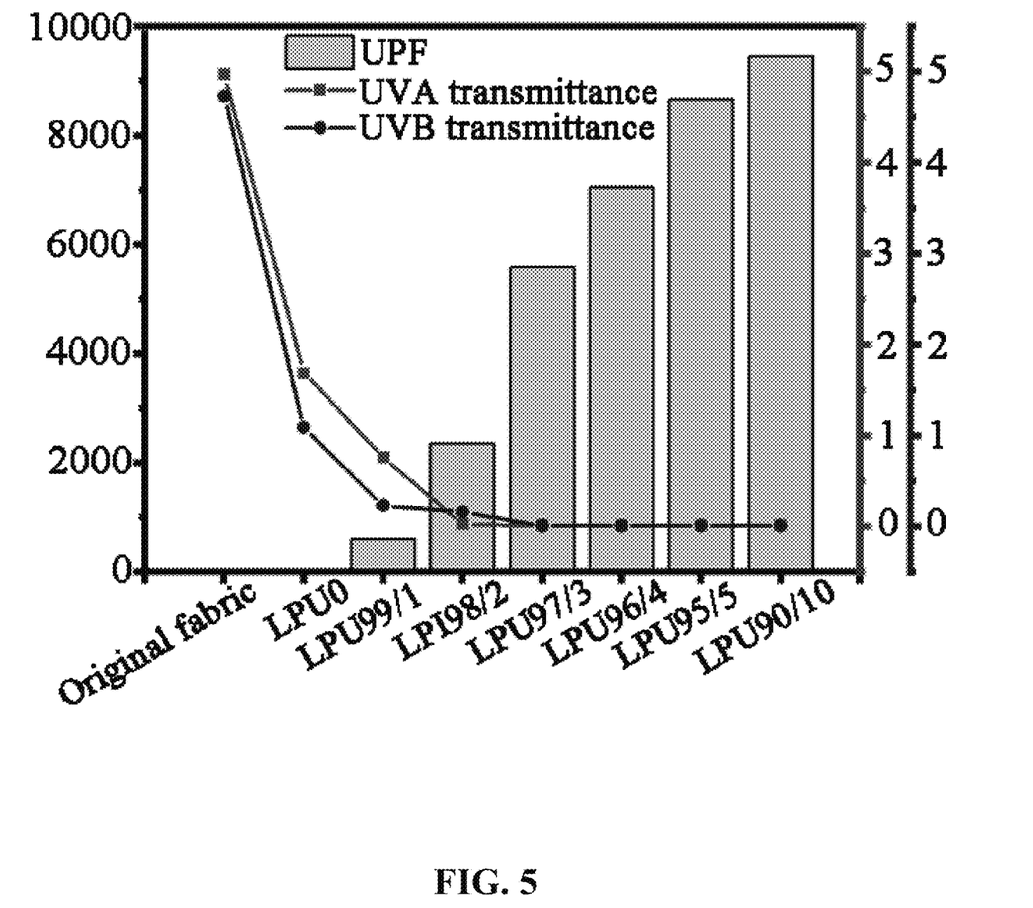
FIG. 5 shows a schematic diagram of the ultraviolet protection factor (UPF) value, and ultraviolet A (UVA) transmittance and ultraviolet B (UVB) transmittance of the hot-pressed fabrics of the lignin-based PU elastomers prepared in all examples of the present disclosure.

The sample numbers corresponding to Comparative Example 1 and Examples 1-6 are LPU0, LPU99/1, LPU98/2, LPU97/3, LPU96/4, LPU95/5 and LPU90/10, respectively. Meanwhile, the contrastive transmittance, mechanical properties, color parameters and UV resistance are shown in FIG. 2 to FIG. 5, respectively. As shown in Table 1 and FIG. 2 to FIG. 5, although a certain loss in mechanical properties, the incorporation of lignin can improve the elastic recovery of the lignin-based PU elastomer; in addition, with the increase of the amount of lignin added, the anti-UV performances of lignin-based PU elastomers are greatly improved, the color becomes darker, and the transmittance decreases.

What is claimed is:

1. A preparation method of an ultraviolet (UV)-resistant and transparent lignin-based polyurethane (PU) elastomer, comprising the following steps:
   (1) dissolving polyether chain polyol and isophorone diisocyanate in N,N-dimethylformamide (DMF), adding a uniformly-dissolved mixture into a container with a polytetrafluoroethylene stirring bar, followed by heating and conducting a reaction at a constant temperature to obtain a prepolymer;
   (2) dissolving 2,2-dimethylolbutyric acid and a catalyst together in the DMF and adding dropwise to the prepolymer for a chain extension reaction; and then dissolving lignin in the DMF and adding dropwise to the prepolymer for an end-capping reaction, followed by adding a neutralizing reagent for a full neutralization after the reactions to obtain a product; and
   (3) subjecting the product obtained in step (2) to rotary evaporation, drying, thermoplastic molding and hot pressing to obtain the lignin-based PU elastomer.

2. The preparation method according to claim 1, wherein in steps (1) and (2), the polyether chain polyol, the 2,2-dimethylolbutyric acid and the lignin are vacuum-dried to remove moisture before addition.

3. The preparation method according to claim 1, wherein in step (1), the polyether chain polyol comprises one or more selected from the group consisting of polytetrahydrofuran 1000, polytetrahydrofuran 2000, polyethylene glycol 1000, polyethylene glycol 2000, polyethylene glycol 4000, polycaprolactone diol 1000 and polycaprolactone diol 2000.

4. The preparation method according to claim 1, wherein in step (1), the reaction is conducted at 80° C. to 85° C. for 2 h to 2.5 h.

5. The preparation method according to claim 1, wherein in step (2), the chain extension reaction and the end-capping reaction each are conducted for 2 h to 2.5 h, and the neutralization is conducted for 0.5 h to 1 h.

6. The preparation method according to claim 1, wherein a molar ratio of an isocyanate group of the isophorone diisocyanate in step (1) to a hydroxyl group in the polyether chain polyol and the 2,2-dimethylolbutyric acid in steps (1) and (2) is 5:2.

7. The preparation method according to claim 1, wherein in step (2), the 2,2-dimethylolbutyric acid and the catalyst have a blending ratio of 100:1 to 50:1, and a dropping rate of 15 ml/h to 20 ml/h.

8. The preparation method according to claim 1, wherein in step (2), the catalyst comprises dibutyltin dilaurate, dimethylcyclohexylamine and pentamethyldiethylene triamine; the neutralizing reagent comprises triethylamine and ammonia water.

9. The preparation method according to claim 1, wherein in step (3), the hot pressing is conducted at 80° C. to 120° C. and 10 MPa to 15 MPa for 10 min to 15 min.

* * * * *